US007676353B2

(12) United States Patent
Bradford et al.

(10) Patent No.: US 7,676,353 B2
(45) Date of Patent: Mar. 9, 2010

(54) TRANSVERSELY ISOTROPIC MODEL FOR WELLBORE STABILITY ANALYSIS IN LAMINATED FORMATIONS

(75) Inventors: Ian Bradford, Cambridge (GB); GongRui Yan, Beijing (CN); Colin Atkinson, Middlesex (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1128 days.

(21) Appl. No.: 11/294,069

(22) Filed: Dec. 5, 2005

(65) Prior Publication Data

US 2007/0143020 A1    Jun. 21, 2007

(51) Int. Cl.
*G06F 7/48* (2006.01)
*G06F 17/10* (2006.01)
(52) U.S. Cl. .................. 703/10; 703/2; 702/11
(58) Field of Classification Search .............. 703/2, 703/10; 702/6, 11
See application file for complete search history.

(56) References Cited

U.S. PATENT DOCUMENTS 5,461,562 A * 10/1995 Tabanou et al. ............. 702/11
6,092,024 A *  7/2000 Wu ............................ 702/7
6,832,158 B2 * 12/2004 Mese et al. .................. 702/9
6,904,365 B2    6/2005 Bratton et al.

OTHER PUBLICATIONS

B.S. Aadnoy, Modeling of the stability of highly inclined boreholes in anisotropic rock formations, SPE Drilling Engineering, September, 259-268, 1988.
E. Fjaer, R.M.Holt, P.Horsrud, A.M. Raaen, and R. Risnes. Petroleum Related Rock Mechanics, Elsvier, Amsterdam, 116, 1992.
D.Okland, Norsk Hydro and J.M.Cook, Bedding-related borehole instability in high angle wells (SPE/ISRM 47285), In Proc. SPE/ISRM Eurock '98 Rock Mechanics in Petroleum Engineering, Trondheim, Jul. 8-10, 1998.
S.M. Willson, N.C. Last, M.D. Zoback, D. Moos, Drilling in South American: A Wellbore Stability Approach for Complex Geologic Conditions, SPE 53940,1999.

* cited by examiner

*Primary Examiner*—Russell Frejd
(74) *Attorney, Agent, or Firm*—Hoffman Warnick LLC

(57) ABSTRACT

A method of predicting wellbore stability is provided and includes: creating a parameterized model of a wellbore in laminated formation, the parameterized model including a plurality of laminated formation and wellbore related parameters; considering measurement data to determine the laminated formation and wellbore related parameters; updating the parameterized model by adopting the determined laminated formation and wellbore related parameters; and applying the updated parameterized model to derive a solution of wellbore stability.

19 Claims, 6 Drawing Sheets

TRANSVERSELY ISOTROPIC MODEL FOR WELLBORE STABILITY ANALYSIS IN LAMINATED FORMATIONS

FIELD OF THE INVENTION

The present invention relates generally to oil and gas well drilling and hydrocarbon production. More particularly, the present invention relates to a model of predicting wellbore stability in laminated formations.

BACKGROUND OF THE INVENTION

Stress-induced wellbore failures are common in oilfield exploration and production. This problem has been an important concern for operators, as borehole collapses and lost circulation during well drilling can cause economic losses. Such stress-induced wellbore failures can also cause problems in production operations, as sanding control and management are of utmost importance for the economy of a field. Therefore, to safely drill a deep well for hydrocarbon exploration or production, it is necessary to predict the wellbore stability and avoid wellbore failures, and a better understanding of the rock mechanical properties and failure behavior is essential to improve the economics of an oilfield development.

Most of current wellbore stability models are based on the assumption that formation rock is a continuous isotropic medium, thus the traditional shear/tensile failure models of intact rockmass are used. For example, Bradley (1979) laid a milestone for inclined wellbore analysis by providing an analytical solution based on linear, isotropic elasticity.

However, in most cases anisotropy behavior of formation is found, and wellbore failures related to bedding or laminated formations have been widely recognized as a common cause of wellbore instability. Thus it is difficult to apply the theory based on the assumption that formation rock is a continuous isotropic medium on the actual analysis of laminated formations.

To approach the anisotropy behavior of formation, the mechanics of anisotropic material was introduced into engineering in early the 20th century, and much research has been carried out in the area of finding the proper Green's functions to describe the elastic displacement response of a linear elastic medium to the applied force. For example, for transversely isotropic materials, the 3-D Green's functions in a full-space have been obtained. In addition, a generalized formalism to express the deformation of dislocations and cracks in an anisotropic medium has also been obtained. Unfortunately, due to the mathematical difficulty, there is no unique analytical solution to the problem of a borehole embedded in a transversely isotropic material.

Further, several models of the deformation and failure of laminated/bedding rock around a cylindrical cavity have been developed. For example, Aadnoy treats rock as a transversely isotropic elastic material with failure been governed by a Mohr-Coulomb criterion incorporating a single plane of weakness. However, Aadnoy's model has disadvantage that it simplified the transversely isotropic model by using only three elastic parameters, rather than the five that are actually required. Willson et al. also adopted the single plane failure model in analyzing the wellbore stability problems in bedding formations, but unrealistically assumed isotropic elastic behavior when computing the deformation and induced stresses in their model.

Still another approach is to use the existing numerical methods, such as the 3-D Finite Element Method (FEM), to solve for the stress and deformation around a borehole embedded in a laminated formation, and then predict the borehole stability by appropriately incorporating the failure criterion. However, these numerical methods have not been applied to field applications systemically. There are two reasons. First, in laminated formations, boundaries or interfaces between different formations pose great difficulties in discretization of the elements, especially in the cases when the borehole axis is inclined to the axis of the laminated formation plane. Second, 3-D FEM is a computational time costly approach and it is impossible to use this method in a log-based analysis.

SUMMARY OF THE INVENTION

It is therefore an object of the invention to provide methods and apparatus for the prediction of wellbore stability in laminated formations.

It is another object of the invention to provide methods and apparatus for the prediction of wellbore stability in laminated formations which takes into account the laminated formation and wellbore related parameters of the wellbore and the field.

It is a further object of the invention to provide methods and apparatus for the prediction of wellbore stability in laminated formations which can be applied in a log-based analysis.

It is still another object of the invention to develop a semi-analytical mathematical model to compute the deformation and induced stresses around a borehole in transversely isotropic formations.

It is an additional object of the invention to provide methods and apparatus for proposing a hybrid failure criterion for the wellbore stability.

It is still another object of the invention to propose a failure model which takes the failure mechanisms of laminated formations into account to predict borehole instability or sanding.

In accord with the objects of the invention which will be discussed in more detail below, a method of predicting wellbore stability is provided and includes: creating a parameterized model of a wellbore in laminated formation, the parameterized model including a plurality of laminated formation and wellbore related parameters; considering measurement data to determine the laminated formation and wellbore related parameters; updating the parameterized model by adopting the determined laminated formation and wellbore related parameters; and applying the updated parameterized model to derive a solution of wellbore stability.

In a preferred embodiment of the invention, the method further includes repeating the considering and updating steps with additional measurement data to produce a further updated parameterized model to derive a further solution of wellbore stability.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE INVENTION

Figure 1:
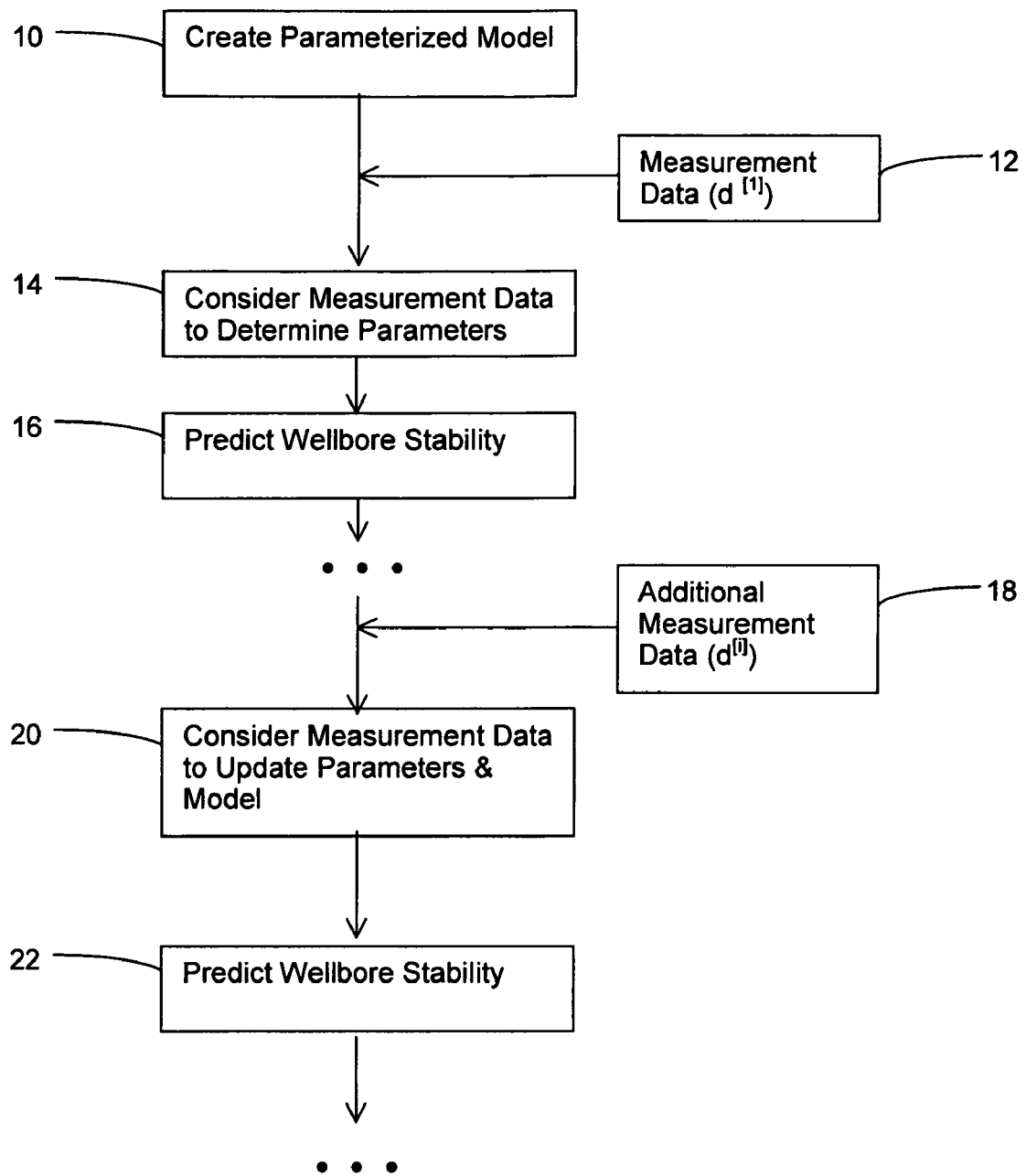
FIG. 1 is a flowchart showing steps associated with the present method, apparatus, and article of manufacture.

FIG. 1 shows several steps associated with the present method, apparatus and article of manufacture and provides a general overview of the invention. In the Create Parameterized Model Step 10, a parameterized model of the wellbore in laminated formation is created. The parameterized model includes a plurality of laminated formation and wellbore related parameters. In one embodiment of the invention, the laminated formation and wellbore related parameters include 5 elastic parameters of laminated formation, e.g. E, E', $\upsilon$, $\upsilon'$ and G'. Respectively, E and E' are the Young's modulus with respect to directions lying in the plane of isotropy and perpendicular to it; $\upsilon$ is the Poisson coefficient characterizing the transverse reduction in the plane of isotropy for tension in the same plane; $\upsilon'$ is the Poisson coefficient characterizing the transverse reduction in the plane of isotropy for tension in a direction normal to it; and G' is the shear modulus for planes normal to the plane of isotropy. The details of the theory and how the model is created will be explained by following drawings and descriptions.

In the Consider Measurement Data to Determine Parameters Step 14, Measurement Data 12 that provides information regarding the formation and wellbore is examined. In one embodiment, Measurement Data 12 is considered to determine the laminated formation and wellbore related parameters. Again, the details of the theory and how the model is created will be explained by following drawings and descriptions.

In the Predict Wellbore Stability Step 16, the parameterized model is updated using the determined laminated formation and wellbore related parameters. The parameterized model is then used to derive the solution of wellbore stability. In another embodiment, data of field in-situ stress derived from a geomechanical model is applied to the parameterized model to derive the solution of wellbore stability.

The Consider Measurement Data to Determine Parameters Step 14 may be repeated as desired using Additional Measurement Data 18 to further update the laminated formation and wellbore related parameters and the parameterized model, as shown in Consider Measurement Data to Update Parameters & Model Step 14. This may be repeated, for instance, whenever a new set of Additional Measurement Data 18 from the subsurface area becomes available. The further updated parameterized model is used to derive a further solution of wellbore stability, as shown in Predict Wellbore Stability Step 22.

The Measurement Data 12 and the Additional Measurement Data 18 may, for instance, consist of different types of data, such as seismic data, drilling data, well logging data, well test data, production history data, permanent monitoring data, or the field boundary conditions of the formation and wellbore. The Measurement Data 12 and the Additional Measurement Data 18 may, alternatively, consist of the same type of data that has been acquired from the subsurface area at different times to measure changes in reservoir.

The above method can be applied in a log-based analysis to derive the solution of wellbore stability as well as in real time drilling. It can also propose a hybrid failure criterion for the wellbore stability.

Figure 2:
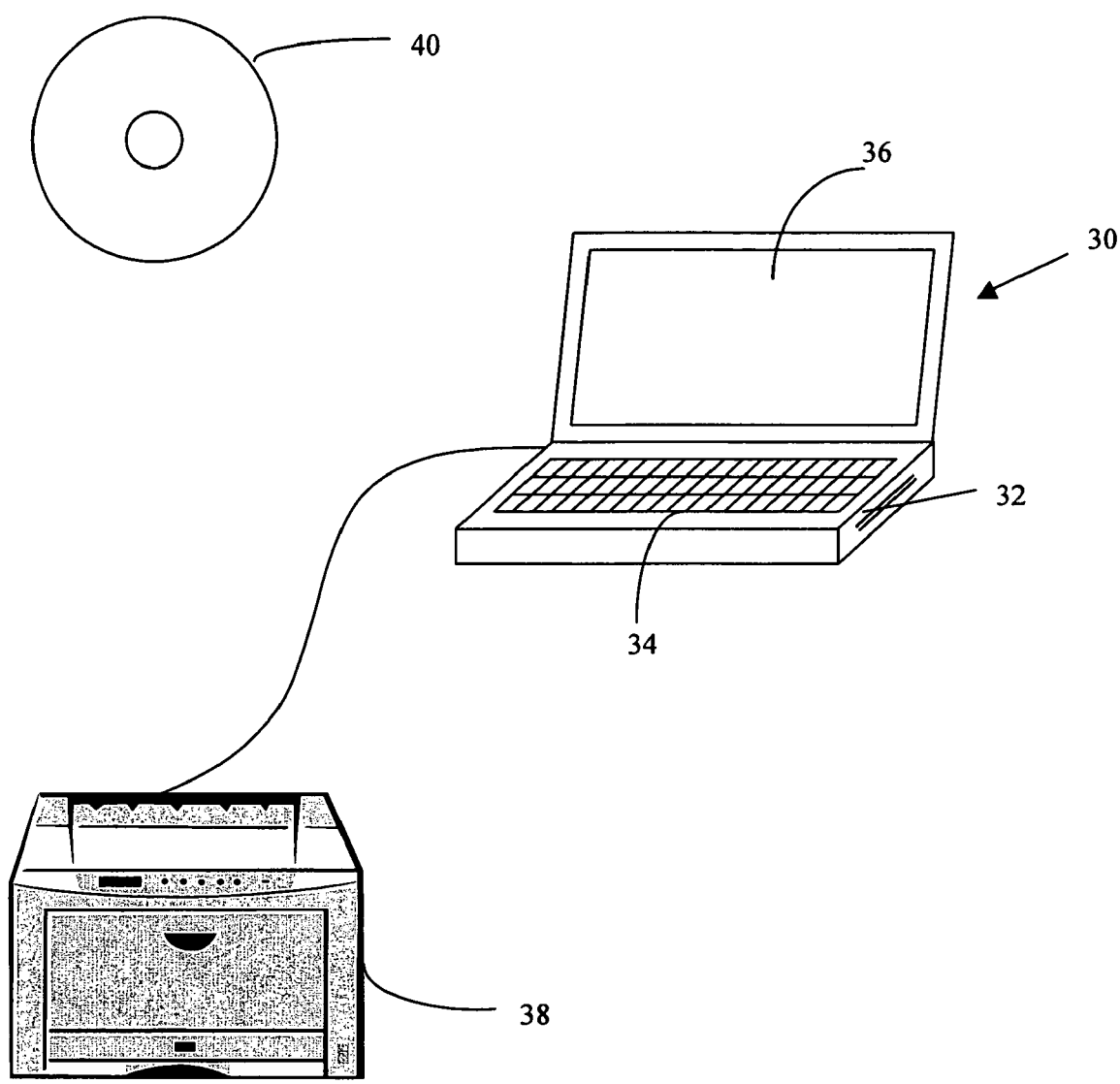
FIG. 2 is a schematic illustration of computer hardware associated with the apparatus and article of manufacture.

FIG. 2 schematically illustrates computer hardware that may be used to implement the inventive method. Computer 30 has a media reading device, such as a CD-ROM Reader 32, a floppy disk device, or a ZIP drive. The media reading device may also be capable of recording the output of the program the computer 30 is running. A user of the computer 30 may enter commands using a user input device, such as a keyboard 34 or a mouse, may view output of the program code on a visual display device, such as monitor 36, and may make hardcopies of output using an output device, such as printer 38. When properly configured, computer 30 (and its associated peripheral devices) is an apparatus for creating a model of a subsurface area in accordance with the present invention. Computer media, such as a CD-ROM 40, a floppy disk, or a ZIP disk, may have computer readable program code that allows the computer 30 to create a model of a subsurface area in accordance with the inventive method.

A preferred embodiment of the inventive method will now be described in substantially more detail. The inventive method addresses two primary issues: how to create a parameterized model of the laminated formation and wellbore, and to propose a failure model which takes the failure mechanisms of laminated formations into account to predict borehole instability or sanding.

The first example will be used to illustrate how to create a parameterized model of the laminated formation and wellbore. The parameterized model of the laminated formation and wellbore is a semi-analytical mathematical model which idealizes the problem by considering a cylindrically cavity embedded in a homogeneous transversely elastic medium under the effects of in-situ stresses and borehole pressure. Based on the model developed by Stroh, a complex function of displacements that satisfies the elastic constitutions of transverse isotropy medium, and force equilibrium conditions, is developed to solve the induced stresses around the borehole. This system and its algorithm can be used in the log analysis to simulate wellbore stability conditions and predict the onset of sanding. In this system, borehole trajectory, formation laminated planes and the directions of in-situ stresses all can be arbitrarily orientated to each other to model the actual field situation. This model includes independent laminated formation related parameters: E, E', $\upsilon$, $\upsilon'$, and G'.

The generalized form of the anisotropic linear elasticity constitution can be expressed as:

$$\sigma_{ij}=c_{ijkl}\epsilon_{kl}=c_{ijkl}\partial u_k/\partial x_l \ (i,j,k,l=1,2,3) \quad (1)$$

where $\sigma_{ij}$ and $\epsilon_{kl}$ are the stress and strain tensor respectively, $C_{ijkl}$ is the elastic stiffness and $u_k$ represent the displacements.

It should be noted that we follow the notation rule that negative normal stress ($\sigma_{ii}<0$) represents compression stress and positive normal stress represents tension stress.

Figure 3:
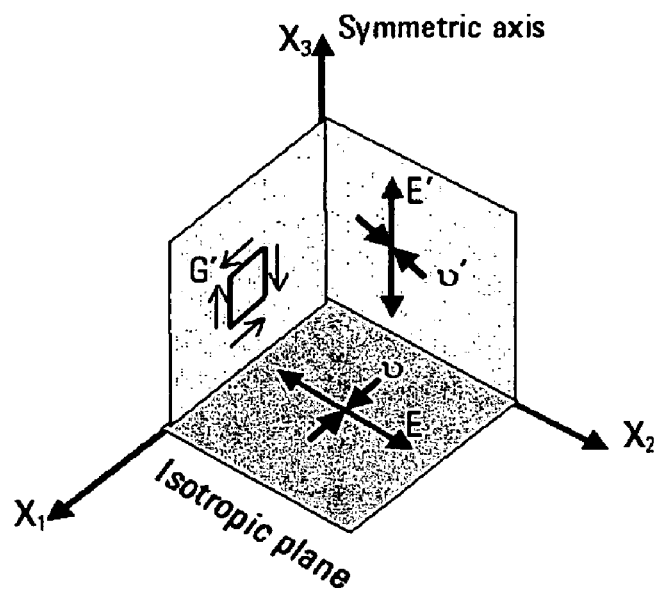
FIG. 3 is a diagram used to illustrate the material coordinate system of transversely isotropic material.

FIG. 3 is a diagram illustrating the material coordinate system of transversely isotropic material. If we assume the laminated formation rock to be continuous, homogeneous and transversely isotropic, the constitutive relations can be expressed in the material coordinate system $X_1X_2X_3$ as:

$$\begin{Bmatrix} \varepsilon_{11} \\ \varepsilon_{22} \\ \varepsilon_{33} \\ 2\varepsilon_{23} \\ 2\varepsilon_{31} \\ 2\varepsilon_{12} \end{Bmatrix} = \begin{bmatrix} a_{11} & a_{12} & a_{13} & 0 & 0 & 0 \\ a_{12} & a_{11} & a_{13} & 0 & 0 & 0 \\ a_{13} & a_{13} & a_{33} & 0 & 0 & 0 \\ 0 & 0 & 0 & a_{44} & 0 & 0 \\ 0 & 0 & 0 & 0 & a_{44} & 0 \\ 0 & 0 & 0 & 0 & 0 & a_{66} \end{bmatrix} \begin{Bmatrix} \sigma_{11} \\ \sigma_{22} \\ \sigma_{33} \\ \sigma_{23} \\ \sigma_{31} \\ \sigma_{12} \end{Bmatrix} \quad (2)$$

where $a_{ij}$ (ij=1,2, . . . 6) are components of the transversely isotropic elastic compliance tensor.

The non-zero components are:

$$a_{11}=1/E;\ a_{12}=-\upsilon/E;\ a_{13}=-\upsilon'/E'; \quad (3)$$

$$a_{33}=1/E';\ a_{44}=1/G';\ a_{66}=2(1+\upsilon)/E$$

where E, E', $\upsilon$, $\upsilon'$ and G' are the five independent elastic parameters. Respectively, E and E' are the Young's moduli with respect to directions lying in the plane of isotropy and perpendicular to it; $\upsilon$ is the Poisson coefficient characterizing the transverse reduction in the plane of isotropy for tension in the same plane; $\upsilon'$ is the Poisson coefficient characterizing the transverse reduction in the plane of isotropy for tension in a direction normal to it; and G' is the shear modulus for planes normal to the plane of isotropy, as shown in FIG. 3. Thus, all five independent laminated formation related parameters (E, E', $\upsilon$, $\upsilon'$, and G') are considered.

Figure 4:
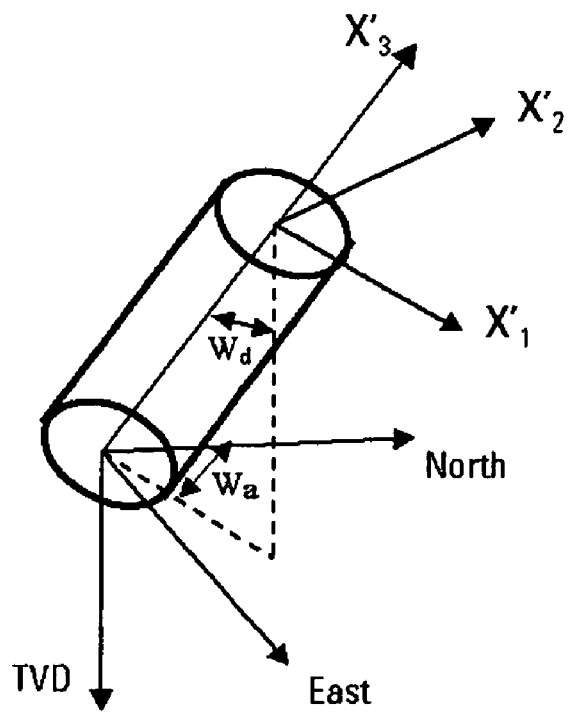
FIG. 4 is a diagram used to illustrate the borehole orientation and coordinate system.
Figure 5:
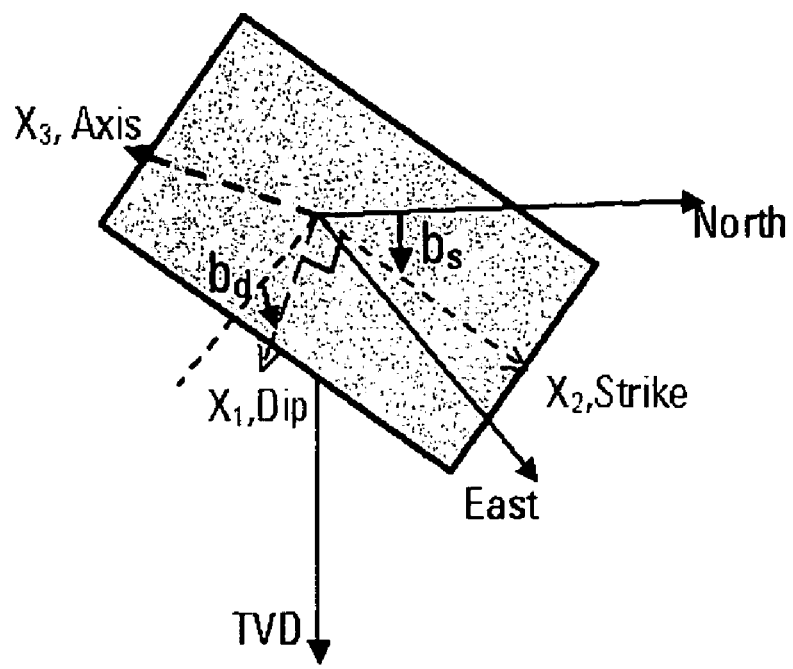
FIG. 5 is a diagram used to illustrate the laminated formation strike and dip.

FIG. 4 is a diagram illustrating the borehole orientation and coordinate system. Considering an orientated wellbore (with inclination $w_d$ and azimuth $w_a$, azimuth is referenced to North) that is embedded in a transversely isotropic medium, we can define a borehole coordinate system $X'_1X'_2X'_3$, as shown in FIG. 4, in which $X'_3$ is along the borehole axis and pointing upwards, and $X'_1$ pointing to the lowest part of borehole wall in the vertical plane. The isotropic plane is defined by a strike angle $b_s$ and a dip angle $b_d$, as shown in FIG. 5, which can define the material coordinate system $X_1X_2X_3$.

The geometric transformation tensor B, from the material coordinate system $X_1X_2X_3$ to borehole coordinate system $X'_1X'_2X'_3$ can be expressed as:

$$[B] = \begin{bmatrix} B_{11} & B_{12} & B_{13} \\ B_{21} & B_{22} & B_{23} \\ B_{31} & B_{32} & B_{33} \end{bmatrix} \quad (4)$$

Within the wellbore coordinates $X'_1X'_2X'_3$, the elastic compliance tensor $a'_{ij}$ can be obtained by:

$$a'_{ij} = \sum_{m=1}^{6} \sum_{n=1}^{6} a_{mn} q_{mi} q_{nj} \quad (5)$$

where $q_{ij}$ is a geometric transformation function and can be obtained from the geometric transformation tensor B as:

$$q_{ij} = \begin{pmatrix} B_{11}^2 & B_{21}^2 & B_{31}^2 & 2B_{21}B_{31} & 2B_{31}B_{11} & 2B_{11}B_{21} \\ B_{12}^2 & B_{22}^2 & B_{32}^2 & 2B_{22}B_{32} & 2B_{32}B_{12} & 2B_{12}B_{22} \\ B_{13}^2 & B_{23}^2 & B_{33}^2 & 2B_{23}B_{33} & 2B_{33}B_{13} & 2B_{13}B_{23} \\ B_{12}B_{22} & B_{22}B_{23} & B_{32}B_{33} & B_{22}B_{33}+B_{32}B_{23} & B_{12}B_{33}+B_{32}B_{13} & B_{12}B_{23}+B_{22}B_{13} \\ B_{13}B_{11} & B_{23}B_{21} & B_{33}B_{31} & B_{23}B_{31}+B_{33}B_{21} & B_{13}B_{31}+B_{33}B_{11} & B_{13}B_{21}+B_{23}B_{11} \\ B_{11}B_{12} & B_{21}B_{22} & B_{31}B_{32} & B_{21}B_{32}+B_{31}B_{22} & B_{11}B_{32}+B_{31}B_{12} & B_{11}B_{22}+B_{21}B_{12} \end{pmatrix} \quad (6)$$

The flowing equations are expressed in the borehole coordinate system $X'_1X'_2X'_3$. For the simplification of the derivation, we will name the system as x1x2x3 later on.

Assuming the generalized plane strain condition in the plane perpendicular to borehole axis, and following Stroh's formalism, the displacements of rock around the borehole have the form:

$$u_k=A_k f(x_1+Px_2)\ (k=1,2,3) \quad (7)$$

where $f$ is an analytical function of the complex variable $Z=x_1+ix_2$, P and $A_k$ are coefficients.

The equilibrium equations $\partial\sigma_{ij}/\partial x_j=0$ require:

$$(C_{i1k1}+P(C_{i1k2}+C_{i2k1})+P^2 C_{i2k2})A_k=0\ (i,\ k=1,2,3) \quad (8)$$

Non-trivial values of $A_k$ occur if P satisfies the equation:

$$|C_{i1k1}+P(C_{i1k2}+C_{i2k1})+P^2 C_{i2k2}|=0 \quad (9)$$

Compacting the $C_{ijkl}$ tensor following Voigt's recipe, the above equations can be rewritten as:

$$(P^2 g_{11}-2P^3 g_{16}+P^4(2g_{12}+g_{66})-2Pg_{26}+g_{22})(P^2 g_{55}-2Pg_{45}+g_{44})-(P^3 g_{15}-P^2(g_{14}+g_{56})+P(g_{25}+g_{46})-g_{24})^2=0 \quad (10)$$

where $$g_{ij}=a'_{ij}-a'_{i3}a'_{j3}/a'_{33}\ (i,j=1,2,3,4,5,6) \quad (11)$$

The roots of the equation (10) occur in conjugate pairs. The three roots with positive imaginary parts will be denoted by $P_\alpha$ ($\alpha=1,2,3$), with corresponding eigenvectors been denoted by $A_{k\alpha}$.

Variables $Z_\alpha$ are defined as:

$$Z_\alpha=x_1+P_\alpha x_2 \quad (12)$$

Now we can express the displacements as:

$$u_k = \sum_\alpha A_{k\alpha} f_\alpha(z_\alpha) + \sum_\alpha \overline{A}_{k\alpha} \overline{f_\alpha(z_\alpha)} \quad (13)$$

The stresses are given from the generalized Hook's law:

$$\sigma_{i1} = -\sum_\alpha L_{i\alpha} P_\alpha f'_\alpha(z_\alpha) - \sum_\alpha \overline{L}_{i\alpha} \overline{P}_\alpha \overline{f'_\alpha(z_\alpha)} \quad (14)$$

$$\sigma_{i2} = \sum_\alpha L_{i\alpha} f'_\alpha(z_\alpha) + \sum_\alpha \overline{L}_{i\alpha} \overline{f'_\alpha(z_\alpha)} \quad (15)$$

As $\sigma_{12}=\sigma_{21}$, it then implies:

$$L_{1\alpha}+P_\alpha L_{2\alpha}=0 \tag{16}$$

where $L_{i\alpha}$ are defined by:

$$L_{i\alpha} = \begin{pmatrix} -P_1 & -P_2 & -P_3 \\ 1 & 1 & 1 \\ l_1 & l_2 & l_3 \end{pmatrix} \tag{17}$$

The coefficients la are determined by:

$$l_\alpha = \frac{P_\alpha^3 g_{15} - P_\alpha^2(g_{14}+g_{66}) + P_\alpha(g_{26}+g_{46}) - g_{24}}{P_\alpha^2 g_{55} + 2P_\alpha g_{45} - g_{44}} \tag{18}$$

In the case when one root of $l_\alpha$ solved from the above equation (18) equals infinity, i.e. one $P_\alpha$ satisfies:

$$P_\alpha^2 g_{55} + 2P_\alpha g_{45} - g_{44} = 0 \tag{19}$$

Then let the $P_\alpha$ be donated as $P_3$, The $L_{i\alpha}$ are then given by:

$$L_{i\alpha} = \begin{pmatrix} -P_1 & -P_2 & 0 \\ 1 & 1 & 0 \\ l_1 & l_2 & 1 \end{pmatrix} \tag{20}$$

Define complex variables $\gamma_\alpha$ as:

$$\gamma_\alpha = (i-P_\alpha)/(i+P_\alpha) \tag{21}$$

Then the complex variable $Z_\alpha$ can be rewritten as:

$$z_\alpha = x_1 + P_\alpha x_2 \tag{22}$$

$$= \frac{(1-iP_\alpha)}{2}(z+\gamma_\alpha \bar{z})$$

The above equations (13, 14, and 15) give the general form of displacements and stresses for transversely isotropic material under the plane strain condition. With given elastic constants in wellbore coordinate system $\alpha'_{ij}$, coefficients $P_\alpha$ and $L_{i\alpha}$ can be determined.

Next let us analyze the wellbore problems. As the problem under consideration comprises a wellbore (let us assume the radial length is a) bounded internally by $|z|=a$, it is convenient to generalize the approach of Green and Zerna and define the complex variables $\zeta_\alpha$ ($\alpha=1,2,3$) such that:

$$z_\alpha = \frac{(1-iP_\alpha)}{2}\left(\zeta_\alpha + \frac{\gamma_\alpha a^2}{\zeta_\alpha}\right) \tag{23}$$

The $\zeta_\alpha$ planes are chosen so that the circles $|\zeta_\alpha|=\alpha$ correspond to the circles of $|z|=a$ in the z-plane, with $|\zeta_\alpha|\to\infty$ as $|z|\to\infty$. To every point in plane $\zeta_\alpha$ on or outside the circle, there corresponds one point in the plane z ($z=x_1+i\,x_2$) on or outside this wellbore circle.

It can be seen from equation (23) that:

$$f'(z_\alpha) = f'(\zeta_\alpha)\frac{d\zeta_\alpha}{dz_\alpha} \tag{24}$$

-continued $$= \frac{2f'(\zeta_\alpha)}{(1-iP_\alpha)(1-\gamma_\alpha a^2/\zeta_\alpha^2)}$$

In plane polar coordinates $z(r,\theta)$, with $x_1=r\cos\theta$, $x_2=r\sin\theta$, the displacements and stresses can be written as:

$$u_r+iu_\theta = e^{-i\theta}(u_1+iu_2) \tag{25}$$

$$\sigma_{rr}+\sigma_{\theta\theta} = \sigma_{11}+\sigma_{22} \tag{26}$$

$$\sigma_{rr}-\sigma_{\theta\theta}+2i\sigma_{r\theta} = e^{-2i\theta}(\sigma_{11}-\sigma_{22}+2i\sigma_{12}) \tag{27}$$

Thus combining the above equations with equations (14) and (15), yields:

$$\sigma_{\theta\theta}-i\sigma_{r\theta} = \sum_\alpha (1+iP_\alpha)(1-e^{-2i\theta}\gamma_\alpha)\frac{L_{2\alpha}f'_\alpha(\zeta_\alpha)}{1-\gamma_\alpha a^2/\zeta_\alpha^2} + \sum_\alpha (1-i\bar{P}_\alpha)(1+e^{-2i\theta}/\bar{\gamma}_\alpha)\frac{\bar{L}_{2\alpha}\bar{f}'_\alpha(\bar{\zeta}_\alpha)}{1-\bar{\gamma}_\alpha a^2/\bar{\zeta}_\alpha^2} \tag{28}$$

$$\sigma_{rr}+i\sigma_{r\theta} = \sum_\alpha (1+iP_\alpha)(1-e^{-2i\theta}\gamma_\alpha)\frac{L_{2\alpha}f'_\alpha(\zeta_\alpha)}{1-\gamma_\alpha a^2/\zeta_\alpha^2} + \sum_\alpha (1-i\bar{P}_\alpha)(1+e^{-2i\theta}/\bar{\gamma}_\alpha)\frac{\bar{L}_{2\alpha}\bar{f}'_\alpha(\bar{\zeta}_\alpha)}{1-\bar{\gamma}_\alpha a^2/\bar{\zeta}_\alpha^2} \tag{29}$$

The axial stress, $\sigma_{zz}$, is derived from the plane strain constraint $\epsilon_{zz}=0$. Thus:

$$\sigma_{zz}=\sigma_{zz0}-(a'_{31}\sigma_{rr}+a'_{32}\sigma_{\theta\theta}+a'_{34}\sigma_{\theta z}+a'_{35}\sigma_{rz}+a'_{36}\sigma_{r\theta})/a'_{33} \tag{30}$$

where $\sigma_{zz0}$ is the in-situ normal stress in Z direction.

Here we proposed an appropriate form for $\theta'(z_\alpha)$ as:

$$f'(z_\alpha) = C_\alpha + \frac{a^2}{\zeta_\alpha^2}D_\alpha \quad (\alpha=1,2,3) \tag{31}$$

where $C_\alpha$ and $D_\alpha$ are complex constants that are to be determined from the boundary conditions.

The boundary condition at the wellbore wall, $|z|=a$, is $$\sigma_{rr}=P_w \tag{32}$$

$$\sigma_{r\theta}=0 \tag{33}$$

$$\sigma_{rz}=0 \tag{34}$$

where $P_w$ is the well pressure.

The boundary condition of stress at far-field is the in-situ stresses, that is:

$$\sigma_{rr}+\sigma_{\theta\theta}=\sigma^\infty_{11}+\sigma^\infty_{22} \tag{35}$$

$$\sigma_{rr}-\sigma_{\theta\theta}+2i\sigma_{r\theta} = e^{-2i\theta}(\sigma^\infty_{11}+\sigma^\infty_{22}+2i\sigma^\infty_{12}) \tag{36}$$

$$\sigma_{zr}=(e^{i\theta}(\sigma^\infty_{31}-i\sigma^\infty_{32})+e^{-i\theta}(\sigma^\infty_{31}+i\sigma^\infty_{32}))/2 \tag{37}$$

where $\sigma^\infty_{11}$, $\sigma^\infty_{22}$, $\sigma^\infty_{12}$, $\sigma^\infty_{31}$ and $\sigma^\infty_{32}$ are the in-situ stresses.

Each of the equations 32~37 can be split into real and imaginary parts. Thus, there are twelve equations for twelve unknowns (the real and imaginary parts of each $C_\alpha$ and $D_\alpha$ counting as one unknown). However, the imaginary part of equation (35) is identically satisfied, so the system is underdetermined. The additional equation comes from the requirement that a rigid body motion does not affect the stress condition. Thus:

$$\sum_\alpha \text{Im}((1+iP_\alpha)C_\alpha) = 0 \quad (38)$$

Thus using the above conditions, we can solve the complex constants $C_\alpha$ and $D_\alpha$, and then compute the displacements and stress around the wellbore.

Therefore, by assuming the laminated formation rock as continuous, homogeneous, and a transversely isotropic linear elastic medium, we derived the semi-analytical mathematical model based on Stroh's method and the generalized plane-stain concepts. Complex variables are defined to describe the deformation field in the wellbore coordinate system. Using the equilibrium equations and boundary conditions, the displacements can be solved and hence the induced stresses are obtained.

Figure 6:
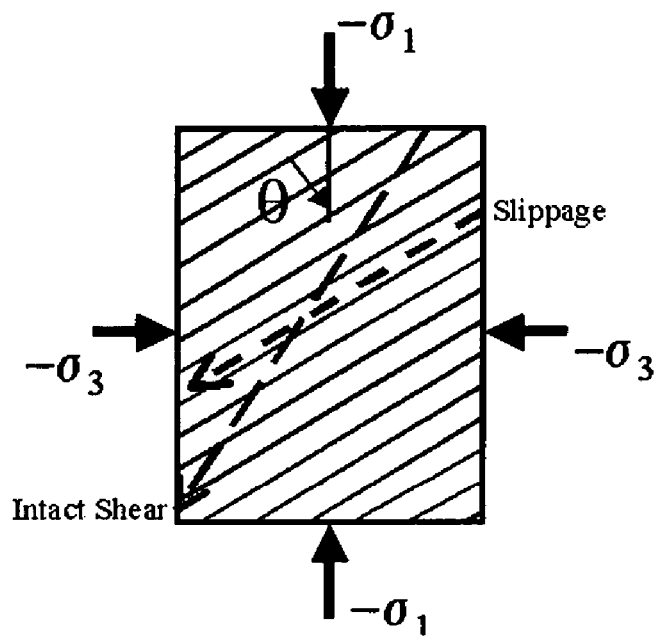
FIG. 6 is a diagram used to illustrate the intact rock shear failure and weakness plane slippage shear failure.

The second example will be used to illustrate the failure model which takes the failure mechanisms of laminated formations into account to predict borehole instability or sanding. Specifically, the consideration that the laminated formation is comprised of intact rockmass and the interfaces between the intact rockmass, two types of shear failures, shear failure of intact rockmass and shear slippage along a single interface (or a weakness plane), are included in this proposed failure model, as shown in FIG. 6.

For intact rockmass shear failure, we assume that it is governed by the classical Morh-Coulomb criterion, that is:

$$-(\sigma_1+P_p) >= UCS-(\sigma_3+P_p)\tan^2(\phi/2+\pi/4) \quad (39)$$

where $\sigma_1$ and $\sigma_3$ are the maximum and minimum principal stress respectively, $P_p$ is the formation pore pressure, and UCS and $\phi$ are rockmass unconfined compressional strength and friction angle respectively.

Shear slippage along the weakness plane is governed by the shear strength of the plane. Let $\tau$ and $\sigma_n$ donate the shear and normal stress applying on this single plane, thus the slippage failure will occur when:

$$|\tau| >= Co-(\sigma_n+P_p)\tan\Phi \quad (40)$$

where $C_o$ and $\Phi$ are the cohesive strength and the friction angle of the weakness plane respectively.

Wellbore shear failure can occur either by exceeding the strength of the intact rockmass or by exceeding the strength of the weakness plane. In this approach, we assume that the most risky failure mode will dominate the failure mode of the formation rock. Once this failure occurs at a particular position, it will propagate in some way and the stress state near this point will be changed, and thus another failure mode will be shielded.

Here we define two dimensionless shear failure factors, $f_{intact}$ for intact rock and $f_{plane}$ for the weakness plane, to represent the risk of these two shear failures respectively:

$$f_{intact} = \frac{(-\sigma_1+\sigma_3)}{ucs(1-\sin\phi)+(-\sigma_1-\sigma_3-2P_p)\sin\phi} \quad (41)$$

$$f_{plane} = \frac{|\tau|}{c_o-(\sigma_n+P_p)\tan\Phi} \quad (42)$$

As we can see from the above definitions, $f_{intact}$ and $f_{plane}$ are the ratio of shear stress that tending to cause failure, over the resistance to failure. $f_{intact}=1$ and $f_{plane}=1$ represent the critical conditions for intact rock shear failure and plane slippage shear failure respectively. The greater the value of shear failure factors $f_{intact}$ and $f_{plane}$, the higher the risk that failure will occur.

We now provide some experimental results of applying the parameterized model of the laminated formation and the failure model to predict borehole instability or sanding. A few of case studies are provided, which yields further insights into this distinct mechanical behavior of wellbore stability in laminated formations.

A typical set of test data was used in the following example using the current system. In order to gain some basic understanding of the influences of Transversely Isotropy on wellbore stability, we will present the results of this numerical analysis systematically and covering the listed areas:

Induced stresses around a wellbore;
Deformation characteristics of a wellbore, and
Wellbore trajectory sensitivity analysis The mechanical parameters of the laminated formation and other in-situ properties are:

TI formation elastic constants:
E=9.4 GPa, E'=5.2 GPa, υ=0.21, υ'=0.34, G'=5.83 GPa TI formation rock strength (UCS and friction angle):
UCS=18.5 MPa, $\phi$=20

Weakness plane strength (Cohesion and friction angle):
Co=6.35 MPa, $\Phi$=15

Laminated plane direction:
Strike $b_s$=0, Dip $b_d$=0

In-situ stresses:
Sv=69 MPa, SH=64.1 MPa, Sh=61.6 MPa, Azim of Sh=0, Pp=20 MPa

Induced Stress Around Wellbore

Figure 7:
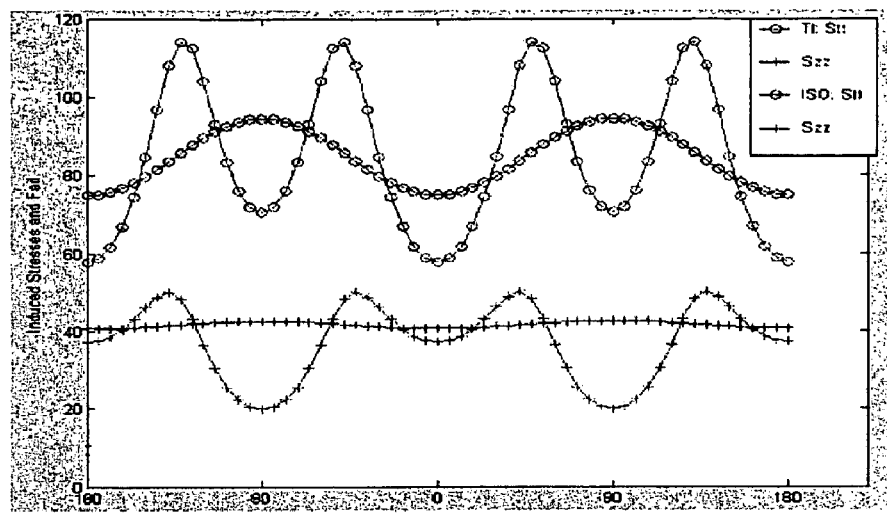
FIG. 7 is a diagram used to illustrate an example of the result of the present method to indicate induced stresses around wellbore circumference.

Referring to FIG. 7, the induced tangential and axial stresses around the wellbore circumference versus azimuth (red lines) are displayed. For comparison reason, the results for the isotropic medium (using the properties in symmetric plane) are also displayed in the same figure (blue lines). Specifically, red line with circle shows the tangential stress for TI formation; red line with cross shows the axial stress for TI formation; blue line with circle shows the tangential stress for isotropic formation; and blue line with cross shows the axial stress for isotropic formation. The wellbore is in the symmetric plane (horizontal in this case) and aligned in the direction of minimum horizontal stress (Sh), and the well pressure is 28 MPa.

Figure 8:
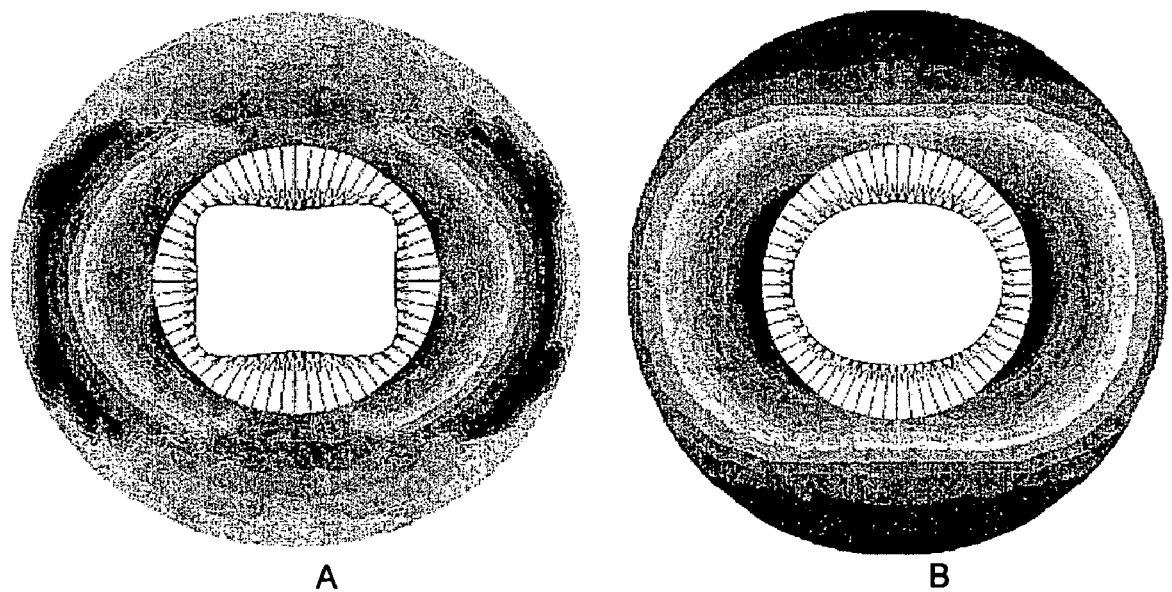
FIG. 8 is a group of diagrams used to illustrate another example of the result of the present method to indicate the displacements of wellbore circumference.

We can see that the anisotropy has a big influence on induced stresses in the cases where the wellbore is aligned in or near the direction of symmetric plane. Comparing with the isotropic formations, in the Transverse formations, the induced stresses around wellbore circumference are:

Stresses are more concentrated and the variations of concentrated stresses are larger;
There are four points where tangential stress is compressional concentrated, and four points where tangential stress is extensional concentrated;
The positions where stresses are concentrated is not aligned with stress directions Deformation of the Wellbore FIG. 8 displays the displacements of wellbore circumference, where the array lines represent the directions and relative magnitudes of displacement. The condition is same as described above. For comparison purpose, we shows the displacements of wellbore circumference of transversely isotropic formation (part A) and isotropic formation (part B). We can find that due to the anisotropic properties of the formation, the wellbore is deformed trending squared shape. This behavior is distinctly different from the isotropic case, when the borehole is deformed elliptically and, the direction of ellipse is controlled by far-field stress directions.

Trajectory Sensitivity Analysis

Figure 9:
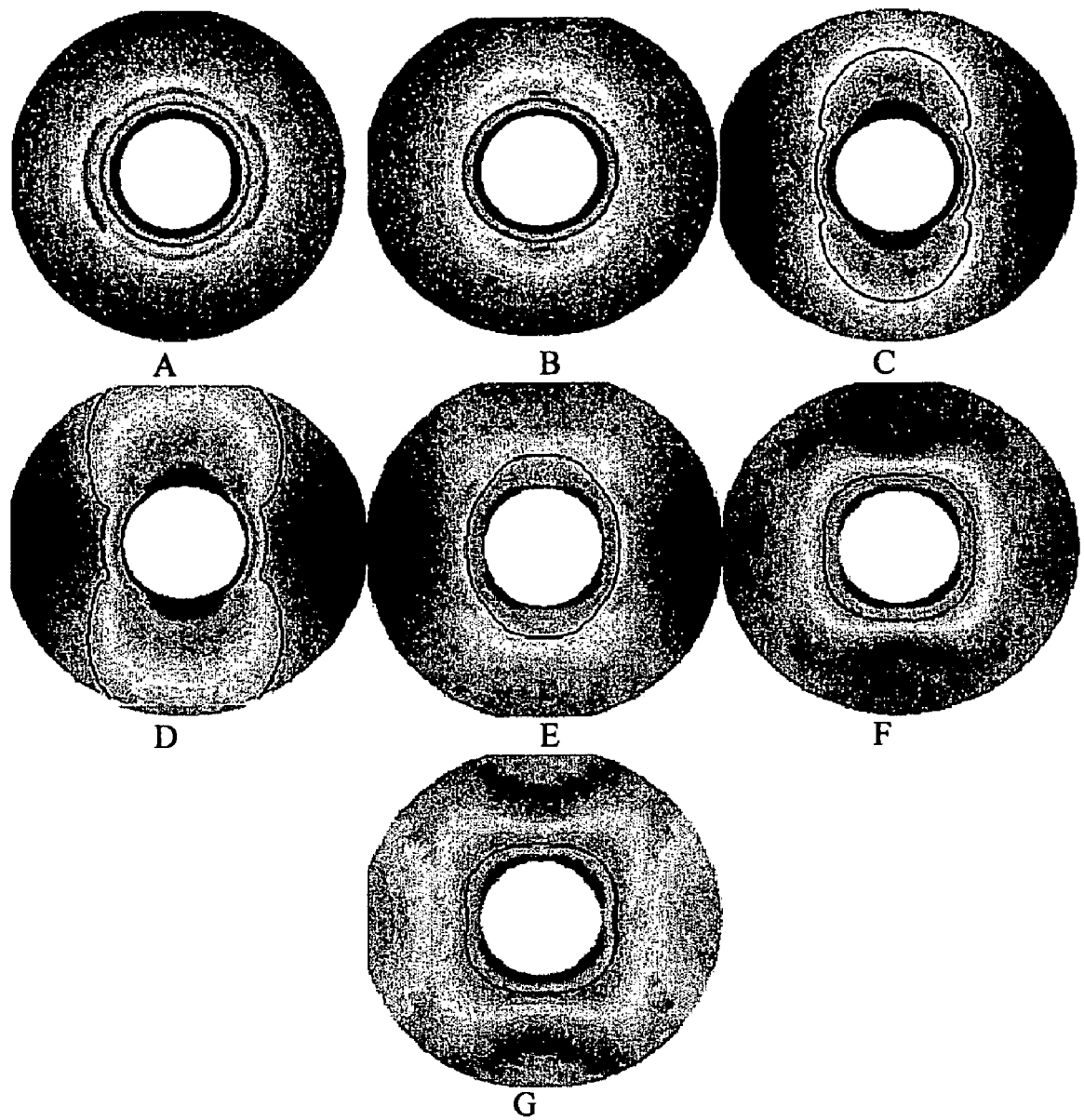
FIG. 9 is a group of diagrams used to illustrate another example of the result of the present method to indicate wellbore stabilities versus deviation.

FIG. 9 displays the stability conditions of wellbore versus borehole deviation. All the input data of the formation properties and in-situ stresses are same, and the well pressure is 28 MPa. In FIG. 9, Parts A to G respectively shows the results of stability at wellbore deviation of 0, 15, 30, 45, 60, 75 and 90 degree, where the color changing from orange to dark red represents the changing of relative stableness of the formation from most stable to most unstable, and the areas inside the black lines are shear failure zones.

From FIG. 9 we can conclude that, the worst wellbore trajectory, regarding to the stability, is the one that inclined to formation symmetric plane with an angle of around 45 degree. When the wellbore deviation is around 45 degree, shear failure zones of the formation is becoming wider and deeper, which means big instability risk.

In summary, from this numerical example using the proposed model, we can draw the following understanding of wellbore stability in laminated formations:

The worst borehole direction is when the angle between the borehole axis and the bedding planes is around 45 degree;

Breakouts cannot give the stress direction in an obvious manner as in the case of the isotropic formations;

In laminated formation, shear failure or wellbore collapse may occur and propagate deep into the formations;

The safe mud window (from the pressure that supports the wellbore from collapsing to the pressure that will fracture the formation) in transversely Isotropic formation is usually narrow in comparison with that in isotropic formations It was shown that the degree of anisotropy has certain influences on the induced stress in the formation rock around the wellbore, but more importantly, it is the angle subtended between the wellbore axis and laminated plane that strongly influences the wellbore stability. The result also shows that in laminated formations, the minimum horizontal stress is not perfectly aligned with the direction of breakout (shear failure zone), and the shape and size of the breakout zone around a borehole is more severe than that in isotropic formations.

The foregoing description of the preferred and alternate embodiments of the present invention has been presented for purposes of illustration and description. It is not intended to be exhaustive or limit the invention to the precise examples described. Many modifications and variations will be apparent to those skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

| Symbol | Definition |
|---|---|
| $\sigma_{ij}$ | stress tensor |
| $\epsilon_{kl}$ | strain tensor |
| $C_{ijkl}$ | elastic stiffness |
| $u_k$ | displacements |
| E and E' | Young's moduli |
| $\upsilon$ and $\upsilon'$ | Poisson coefficient |
| G' | shear modulus |
| $b_s$ | strike angle |
| $b_d$ | a dip angle |
| B | geometric transformation tensor |
| $a_{ij}$ & $a'_{ij}$ | elastic compliance tensors |
| $q_{ij}$ | geometric transformation function |
| f | analytical function |
| P and $A_k$ | coefficients |
| $Z_\alpha$ and $\zeta_\alpha$ | variables |
| $\sigma_{zz}$ | axial stress |
| $\epsilon_{zz}$ | plane strain constraint |
| $C_\alpha$ and $D_\alpha$ | complex constants |
| $P_w$ | well pressure |
| $\sigma^\infty_{11}, \sigma^\infty_{22}, \sigma^\infty_{12}, \sigma^\infty_{31}$ and $\sigma^\infty_{32}$ | in-situ stresses |
| $\sigma_1$ | maximum compressional stress |
| $\sigma_3$ | minimum compressional stress |
| $P_p$ | formation pore pressure |
| UCS | rockmass unconfined compressional strength |
| $\phi$ | rockmass unconfined friction angle |
| $\tau$ | shear stress |
| $\sigma_n$ | normal stress |
| $C_o$ | cohesive strength |
| $\Phi$ | friction angle |
| $f_{intact}$ | intact rock shear failure factor |
| $f_{plane}$ | weakness plane shear failure factors |

We claim:

1. A method of predicting wellbore stability comprising:
   a) introducing a semi-analytical mathematical model which simulates the wellbore drilled in a laminated formation;
   b) inputting measurement data and in-situ stress of the wellbore and the laminated formation;
   c) calculating laminated formation and wellbore related parameters of the semi-analytical mathematical model;
   d) applying said semi-analytical mathematical model by using the laminated formation and wellbore related parameters to derive induced stress around the wellbore and deformation characteristics of the wellbore; and
   e) introducing failure models to derive an intact rock shear failure factor and a plane slippage shear failure factor.

2. The method of claim 1, wherein said semi-analytical mathematical model includes equations:

$$\sigma_{\theta\theta} - i\sigma_{r\theta} = \sum_\alpha (1 + iP_\alpha)(1 + e^{-2i\theta}\gamma_\alpha)\frac{L_{2\alpha}f'_\alpha(\zeta_\alpha)}{1 - \gamma_\alpha a^2/\zeta_\alpha^2}$$

$$+ \sum_\alpha (1 - i\bar{P}_\alpha)(1 + e^{-2i\theta}/\bar{\gamma}_\alpha)\frac{\bar{L}_{2\alpha}\bar{f}'_\alpha(\bar{\zeta}_\alpha)}{1 - \bar{\gamma}_\alpha a^2/\bar{\zeta}_\alpha^2}$$

$$\sigma_{rr} + i\sigma_{r\theta} = \sum_\alpha (1 + iP_\alpha)(1 - e^{-2i\theta}\gamma_\alpha)\frac{L_{2\alpha}f'_\alpha(\zeta_\alpha)}{1 - \gamma_\alpha a^2/\zeta_\alpha^2} \text{ and}$$

$$+ \sum_\alpha (1 - i\bar{P}_\alpha)(1 - e^{-2i\theta}/\bar{\gamma}_\alpha)\frac{\bar{L}_{2\alpha}\bar{f}'_\alpha(\bar{\zeta}_\alpha)}{1 - \bar{\gamma}_\alpha a^2/\bar{\zeta}_\alpha^2}$$

$$\sigma_{zz} = \sigma_{zz0} - (a'_{31}\sigma_{rr} + a'_{32}\sigma_{\theta\theta} + a'_{34}\sigma_{\theta z} + a'_{35}\sigma_{rz} + a'_{36}\sigma_{r\theta})/a'_{33}$$

$\sigma_{\theta\theta}$, $[\sigma_{\gamma\theta}]\sigma_{r\theta}$ and $[\sigma_{\theta\theta}]\sigma_{rr}$ represent in-situ stresses in plane polar coordinates.

3. The method of claim 1, wherein said laminated formation and wellbore related parameters include 5 elastic parameters of laminated formation.

4. The method of claim 1, wherein said laminated formation and wellbore related parameters include Young's moduli along with and perpendicular to the plane of isotropy.

5. The method of claim 1, wherein said laminated formation and wellbore related parameters include Poisson coefficients along with and perpendicular to the plane of isotropy.

6. The method of claim 1, wherein said laminated formation and wellbore related parameters include shear modulus perpendicular to the plane of isotropy.

7. The method of claim 1 further comprising computing at least one constant of said parameterized model to derive the solution of wellbore stability.

8. The method of claim 1 further comprising proposing a hybrid failure criterion for said wellbore stability.

9. The method of claim 1, wherein said measurement data comprise seismic data, drilling data, well logging data, well test data, production history data, or permanent monitoring data.

10. The method of claim 1, wherein said measurement data comprise data of field boundary conditions.

11. The method of claim 1, wherein said measurement data comprise data of field in-situ stress.

12. The method of claim 1, wherein said updating step comprises directly updating said parameterized model using additional measurement data obtained while drilling.

13. The method of claim 1 further comprising comparing the induced stress around the wellbore and deformation characteristics of the wellbore with stress and deformation characteristics resulting from additional drilling data and log data.

14. The method of claim 13 further comprising:
applying the semi-analytical mathematical model, if the induced stress around the wellbore and deformation characteristics of the wellbore match the stress and deformation characteristics resulting from additional drilling data and log data; and
updating the semi-analytical mathematical model, if the induced stress around the wellbore and deformation characteristics of the wellbore do not match the stress and deformation characteristics resulting from additional drilling data and log data.

15. The method of claim 1, wherein the intact rock shear failure factor and the plane slippage shear failure factor are indications of the wellbore stability.

16. An apparatus for predicting wellbore stability comprising:
a) means for introducing a semi-analytical mathematical model which simulates the wellbore drilled in a laminated formation;
b) means for inputting measurement data and in-situ stress of the wellbore and the laminated formation;
c) means for calculating laminated formation and wellbore related parameters of the semi-analytical mathematical model;
d) means for applying said semi-analytical mathematical model by using the laminated formation and wellbore related parameters to derive induced stress around the wellbore and deformation characteristics of the wellbore; and
e) means for introducing failure models to derive an intact rock shear failure factor and a plane slippage shear failure factor.

17. The apparatus of claim 16, wherein said semi-analytical mathematical model includes equations:

$$\sigma_{\theta\theta} - i\sigma_{r\theta} = \sum_\alpha (1+iP_\alpha)(1+e^{-2i\theta}\gamma_\alpha)\frac{L_{2\alpha}f'_\alpha(\zeta_\alpha)}{1-\gamma_\alpha a^2/\zeta_\alpha^2}$$

$$+ \sum_\alpha (1-i\overline{P}_\alpha)(1+e^{-2i\theta}/\overline{\gamma}_\alpha)\frac{\overline{L}_{2\alpha}\overline{f}'_\alpha(\overline{\zeta}_\alpha)}{1-\overline{\gamma}_\alpha a^2/\overline{\zeta}_\alpha^2}$$

$$\sigma_{rr} + i\sigma_{r\theta} = \sum_\alpha (1+iP_\alpha)(1-e^{-2i\theta}\gamma_\alpha)\frac{L_{2\alpha}f'_\alpha(\zeta_\alpha)}{1-\gamma_\alpha a^2/\zeta_\alpha^2} \text{ and}$$

$$+ \sum_\alpha (1-i\overline{P}_\alpha)(1-e^{-2i\theta}/\overline{\gamma}_\alpha)\frac{\overline{L}_{2\alpha}\overline{f}'_\alpha(\overline{\zeta}_\alpha)}{1-\overline{\gamma}_\alpha a^2/\overline{\zeta}_\alpha^2}$$

$$\sigma_{zz} = \sigma_{zz0} - (a'_{31}\sigma_{rr} + a'_{32}\sigma_{\theta\theta} + a'_{34}\sigma_{\theta z} + a'_{35}\sigma_{rz} + a'_{36}\sigma_{r\theta})/a'_{33}$$

$\sigma_{\theta\theta}$, $[\sigma_{\gamma\theta}]\sigma_{r\theta}$ and $[\sigma_{\theta\theta}]\sigma_{rr}$ represent in-situ stresses in plane polar coordinates.

18. A computer program product, comprising:
a computer readable program code stored in a computer readable storage device, the computer readable program code, when executed by a computer system, is configured to:
a) introduce a semi-analytical mathematical model which simulates the wellbore drilled in a laminated formation;
b) input measurement data and in-situ stress of the wellbore and the laminated formation;
c) calculate laminated formation and wellbore related parameters of the semi-analytical mathematical model;
d) apply said semi-analytical mathematical model by using the laminated formation and wellbore related parameters to derive induced stress around the wellbore and deformation characteristics of the wellbore; and
e) introduce failure models to derive an intact rock shear failure factor and a plane slippage shear failure factor.

19. The computer program product of claim 18, wherein said semi-analytical mathematical model includes equations:

$$\sigma_{\theta\theta} - i\sigma_{r\theta} = \sum_\alpha (1+iP_\alpha)(1+e^{-2i\theta}\gamma_\alpha)\frac{L_{2\alpha}f'_\alpha(\zeta_\alpha)}{1-\gamma_\alpha a^2/\zeta_\alpha^2}$$

$$+ \sum_\alpha (1-i\overline{P}_\alpha)(1+e^{-2i\theta}/\overline{\gamma}_\alpha)\frac{\overline{L}_{2\alpha}\overline{f}'_\alpha(\overline{\zeta}_\alpha)}{1-\overline{\gamma}_\alpha a^2/\overline{\zeta}_\alpha^2}$$

$$\sigma_{rr} + i\sigma_{r\theta} = \sum_\alpha (1+iP_\alpha)(1-e^{-2i\theta}\gamma_\alpha)\frac{L_{2\alpha}f'_\alpha(\zeta_\alpha)}{1-\gamma_\alpha a^2/\zeta_\alpha^2} \text{ and}$$

$$+ \sum_\alpha (1-i\overline{P}_\alpha)(1-e^{-2i\theta}/\overline{\gamma}_\alpha)\frac{\overline{L}_{2\alpha}\overline{f}'_\alpha(\overline{\zeta}_\alpha)}{1-\overline{\gamma}_\alpha a^2/\overline{\zeta}_\alpha^2}$$

$$\sigma_{zz} = \sigma_{zz0} - (a'_{31}\sigma_{rr} + a'_{32}\sigma_{\theta\theta} + a'_{34}\sigma_{\theta z} + a'_{35}\sigma_{rz} + a'_{36}\sigma_{r\theta})/a'_{33}$$

$\sigma_{\theta\theta}$, $[\sigma_{\gamma\theta}]\sigma_{r\theta}$ and $[\sigma_{\theta\theta}]\sigma_{rr}$ represent in-situ stresses in plane polar.

* * * * *